No. 685,627. Patented Oct. 29, 1901.
C. MILLER.
VEHICLE WHEEL.
(Application filed June 19, 1901.)
(No Model.)
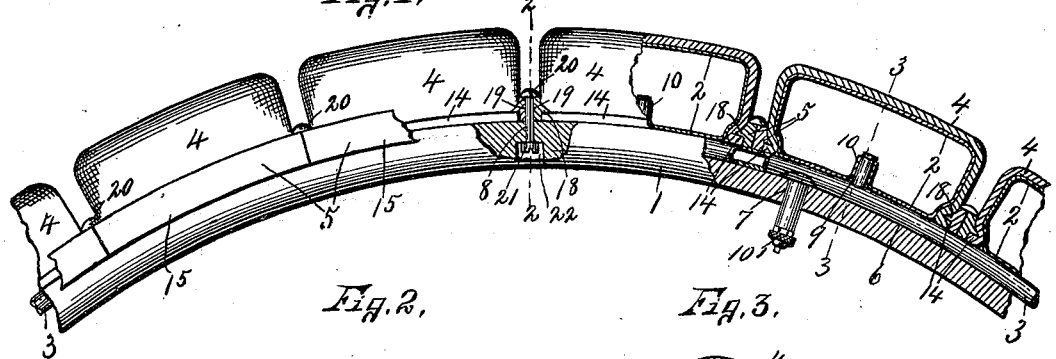
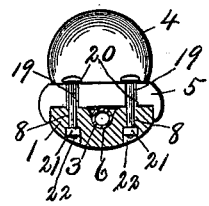 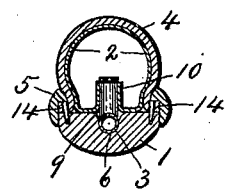
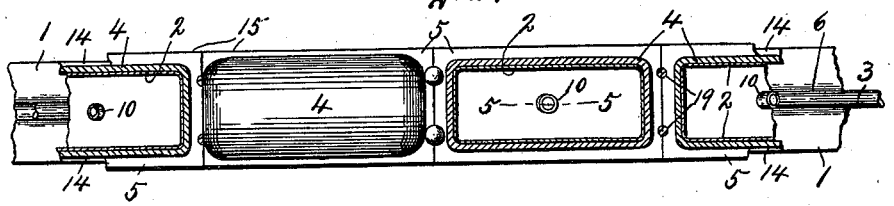
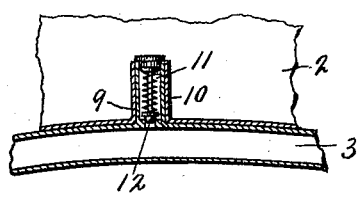 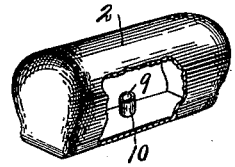
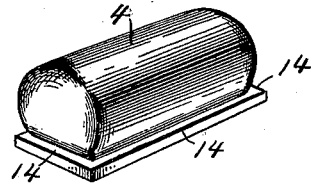 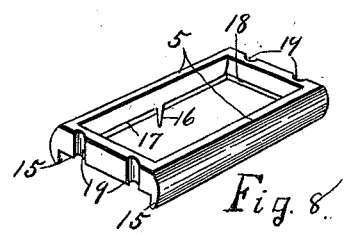
WITNESSES:
INVENTOR
Charles Miller
BY
Smith & Burrow
ATTORNEYS.
THE NORRIS PETERS CO., PHOTO-LITHO., WASHINGTON, D. C.

UNITED STATES PATENT OFFICE.

CHARLES MILLER, OF BINGHAMTON, NEW YORK.

VEHICLE-WHEEL.

SPECIFICATION forming part of Letters Patent No. 685,627, dated October 29, 1901.

Application filed June 19, 1901. Serial No. 65,144. (No model.)

*To all whom it may concern:*

Be it known that I, CHARLES MILLER, of Binghamton, in the county of Broome, in the State of New York, have invented new and useful Improvements in Vehicle-Wheels, of which the following, taken in connection with the accompanying drawings, is a full, clear, and exact description.

This invention relates to improvements in vehicle-wheels, having more particular reference to the rim, sectional pneumatic tire, and means for inflating the several sections of the tire.

The object of this invention is to produce a tire composed of independent inflatable sections connected to a removable air-supply tube encircling the rim of the wheel, whereby the several sections may be simultaneously inflated.

A further object of this invention is to arrange an automatically-closing valve between the air-tube and each of the inflatable sections, whereby the deflation of any one of the tire-sections does not affect the remaining sections.

A further object is to provide each of the sections with a removable cap or cover, the several caps or covers being held in position by independent clamping-frames and the adjacent ends of the clamping-frames being locked to the rim by the same securing means.

To these ends the invention consists in the combination, construction, and arrangement of the parts of a vehicle-wheel, as hereinafter fully described, and pointed out in the claims.

Referring to the drawings, Figure 1 is a side elevation, partly in section, of a portion of a rim having a series of inflatable sections secured thereto, illustrating the construction and operation of my invention. Figs. 2 and 3 are sectional views taken, respectively, on lines 2 2 and 3 3, Fig. 1. Fig. 4 is a top plan, partly in section, of the parts seen in Fig. 1, one of the caps or covers being shown in full and the others in section, showing the inner inflatable sack. Fig. 5 is an enlarged sectional view taken on line 5 5, Fig. 4, showing particularly the valve between the air-supply tube and one of the inflatable sections. Figs. 6, 7, and 8 are isometric views showing, respectively, the inner inflatable sack, the outer cap or cover for the sack, and the clamping-frame for engaging the cap or cover and holding the same in position.

Similar reference characters indicate corresponding parts in all the views.

As seen in the drawings, my invention consists of a rim 1, a series of inflatable sections 2 encircling the rim, an air-supply tube 3 interposed between the rim and sections for simultaneously inflating the sections, an outer cap or cover 4 for each of the sections, and clamping-plates 5 for securing said caps or covers and the inflatable sections in position.

The rim 1 may be of any desired material, is preferably formed of wood or equivalent light material, is provided with an annular recess or groove 6 in its periphery, and is also formed with a substantially radial opening 7 for receiving the air-inlet valve, and with bolt-openings 8, adapted to receive the clamping-bolts which hold the clamping-plates in position.

The inflatable sections 2 are arranged end to end, one in advance of the other, around the periphery of the rim 1 and usually consist of rubber or other elastic bulbs, having their inner faces adjacent to the rim provided with inlet-openings 9 and nipples 10, inclosing said inlet-openings and projecting into the bulb. These inflatable sections 2 may be of any desired form or size, the inlet-openings 9 being adapted to receive the valve-chambers of the air-tube 3 and the walls of said opening, forming the nipple 10, being arranged to fit closely upon the walls of each of said air-inlet chambers for preventing the escape of air through the openings 9.

The air-tube 3 encircles the rim 1, is removably supported in the groove or channel 6, and usually consists of a rubber or equivalent air-conductor provided with an inlet-valve 10' and a plurality of outlet-openings 11, communicating with the interiors of the several inflatable sections 2, whereby said sections may be simultaneously inflated by applying a suitable air-pump to the inlet-opening in which the valve 10' is movable. These several inlet-openings 11 are provided with automatically-closing valves 12, which serve to prevent the escape of air through said openings 11 when the said several sections are inflated. Although I have shown in the drawings the tube 3 as divided transversely in proximity to the valve 10' and the meeting ends of the tube as closed, yet it will be obvious that said tube may be formed continuous, if desired, thus serving the same purpose for simultaneously inflating the several inflatable sections.

The caps or covers 4 are usually formed of sufficient size to conveniently inclose the outer portions of the several inflatable sections 2, each of said caps or sections being provided with an opening in its base for receiving the corresponding sections. These several caps or covers are provided with base-flanges 14, surrounding the opening and projecting laterally from the body of the cap or cover, being adapted to be impinged between the clamping-frames and the periphery of the rim. The caps or covers form the wearing-surface of the inflatable sacks or bulbs and inclose the peripheral side and end walls of said bulbs.

The clamping-plates 5 preferably consist of open metallic frames having longitudinal side walls provided with depending flanges 15, adapted to engage the lateral faces of the rim 1, these side walls being provided with depending spurs 16 and longitudinal shoulders 17 for engaging the longitudinal flanges 14 of the caps or covers 4. The end walls of each of the frames 5 are provided with transverse shoulders 18 and substantially radial grooves 19 in the end faces of the end walls, the shoulders 18 being adapted to engage the end flanges of the caps or covers 4 and recesses or grooves 19 being adapted to receive suitable clamping-bolts 20, presently described. The openings in these frames are of sufficient size to receive the bulbs 2 and caps 4, and the spurs 16 are driven through the caps or covers into the longitudinal edges of the rim, thereby serving to prevent the spreading of the side walls of the frames when the bulbs or sections 2 are inflated. It is evident from the above description that these frames may be formed of very light material, such as sheet-iron or sheet-steel, being arranged one in advance of the other around the periphery of the rim 1, the end faces of the adjacent frames being in close contact with each other. When the sections 2, caps 4, and frames 5 are placed in position upon the rim 1, the bolts 20 are inserted into the adjacent recesses 19, which together with the adjacent recesses of the adjacent frame form suitable bolt-apertures which are alined with the apertures 8 in the rim 1, the bolts 20 being passed through the apertures 8 and provided at their inner ends with suitable nuts 21. The inner ends of the apertures 8 are preferably enlarged for forming recesses 22, which serve to receive the nuts 21, and thereby substantially conceal said nuts, thus forming a smooth surface on the inner face of the rim.

The outer ends of the bolts 20 are provided with heads formed of greater area than the apertures formed by the recesses 19 and engage the outer faces of the adjacent ends of the frames, thereby firmly locking the frames to the rim and at the same time impinging the flanges 14 of the cap or cover 4 between the shoulders 17 and 18 and the periphery of the rim, and thereby holding the caps or covers 4 and sections 2 in their operative position. It is apparent from the foregoing description that should either of the sections 2 become punctured the air will only escape from that particular section and from the tube 3, which contains but a small amount of compressed air, and therefore does not affect the remaining sections. This is a particularly important feature of my invention, and it will be readily understood that owing to the air-pressure within the several sections 2 and incidentally to the spring 11 the valve 12 of each of the sections is positively closed, except, as previously stated, should one of the bulbs become punctured. In this case in order to repair the injured member it is only necessary to remove the frame securing that particular member in position, whereupon a new inflatable section may be inserted and the old cap replaced in position and clamped by its frame and the bolt securing the same in position.

The operation of my invention will now be readily understood upon reference to the foregoing description and the accompanying drawings, and it will be noted that some change may be made therein without departing from the spirit of the invention.

Having described my invention, what I claim, and desire to secure by Letters Patent, is—

1. The combination with the rim of a wheel, of a series of independent inflatable sections encircling the rim, independent caps or covers inclosing the outer surfaces of the sections and detachably secured to the rim, a tube between the rim and sections, and detachably connected to each of the sections for simultaneously inflating the same, said tube being removable from the rim and automatically-closing valves in said connections whereby the deflation of one section does not affect the remaining sections said valves being removable with the tube.

2. In a vehicle-wheel, the combination with a rim, of a removable air-tube encircling the rim and provided with a series of discharge-nipples, automatically-closing valves in said nipples and removable with the tube, a series of independent inflatable sections having openings receiving the nipples, and a plurality of caps or covers inclosing the outer surfaces of the sections and detachably secured to the rim and concealing the tube.

3. In a vehicle-wheel, the combination with a rim, of a removable air-tube encircling the rim and provided with a series of discharge-openings, automatically-closing valves in said openings, a series of independent inflatable sections communicating with said openings, caps or covers for the sections each having a laterally-projecting base-flange, independent removable clamping-frames surrounding the caps or covers and impinging their flanges against the rim, said plates having lengthwise ribs engaging the side edges of the rim, and clamping-bolts having their inner ends locked to the rim and their outer ends interlocked with the adjacent ends of the frames.

4. The combination with a rim and an inflatable tire-section, of a clamping-frame holding the section in position and provided with one or more spurs entering the rim, for the purpose described.

5. The combination with a rim and an inflatable tire-section, of a cap or cover inclosing said section and having a flange, and a clamping-frame impinging the flange against the rim and provided with one or more spurs entering the flange and rim for the purpose set forth.

In witness whereof I have hereunto set my hand this 26th day of April, 1901.

CHARLES MILLER.

Witnesses:
OSCAR S. HELLER,
BENJAMIN A. BAUMANN.